United States Patent [19]

Drozdoff et al.

[11] Patent Number: 5,368,235
[45] Date of Patent: Nov. 29, 1994

[54] SOAKER HOSE ASSEMBLY

[75] Inventors: Matthew L. Drozdoff, Montvale; Steven R. Hopps, Budd Lake, both of N.J.

[73] Assignee: Plastic Specialties and Technologies, Inc., Ridgefield, N.J.

[21] Appl. No.: 565,037

[22] Filed: Aug. 9, 1990

[51] Int. Cl.⁵ ............................................. B05B 15/00
[52] U.S. Cl. ................................... 239/542; 138/44
[58] Field of Search ............... 239/145, 271, 272, 396, 239/542, 547, 553.3; 138/44

[56] References Cited

U.S. PATENT DOCUMENTS

| | | | |
|---|---|---|---|
| 2,755,985 | 7/1956 | Finegan | 239/547 |
| 2,781,058 | 2/1957 | Warhus | 138/45 |
| 2,807,505 | 9/1957 | Weitzel | 239/542 |
| 2,815,041 | 12/1957 | Rimsha et al. | 137/620 |
| 2,891,578 | 6/1959 | Dahl et al. | 138/45 |
| 2,904,809 | 9/1959 | Clayson | 239/547 |
| 3,072,151 | 1/1963 | Quercia | 138/45 |
| 3,199,791 | 8/1965 | Chapin | 239/547 |
| 3,833,019 | 9/1974 | Diggs | 138/45 |
| 4,105,050 | 8/1978 | Hendrickson et al. | 138/45 |
| 4,161,290 | 7/1979 | Hill | 239/542 |
| 4,517,316 | 5/1985 | Mason | 521/81 |
| 4,616,055 | 10/1986 | Mason | 524/381 |
| 4,915,135 | 8/1990 | Kellenbarger et al. | 138/44 |
| 4,930,934 | 6/1990 | Adkins | 239/542 |

*Primary Examiner*—Karen B. Merritt
*Attorney, Agent, or Firm*—Wood, Herron & Evans

[57] ABSTRACT

A flexible water soaker hose is provided having a rigid disk with a fixed aperture for restricting pressurized water through the porous wall of the hose for gentle soaking. The hose is adapted for coupling to a pressurized water supply for delivery of water through the hose. The hose is specially suited for use as a garden hose to irrigate or soak desired areas.

12 Claims, 1 Drawing Sheet

SOAKER HOSE ASSEMBLY

BACKGROUND OF THE INVENTION

I. Field of the Invention

This invention is directed toward the field of hoses, more particularly hoses with coupling connectors at an end for delivering pressurized water, and most particularly to a novel garden soaker hose having a flow restricting aperture and a porous wall along its length for uniform seepage of water.

II. Discussion of the Prior Art

With the increase in population, water is increasingly used and shortages occur more frequently. Accordingly, water has become a more important and scarcer resource that is necessary to conserve. Cultivation of crops, gardens, lawns, foliage, cultivation benches, planters and the like are all important uses of water. Soil soaking devices have been developed for applying water to these areas in need of supplemental watering. Soaker devices must be able to conserve water and provide adequate saturation to allow for sufficient growth while minimizing water loss.

Most of the prior soil soaking devices have functioned as surface watering devices. Surface watering tends to be wasteful since water that is not absorbed quickly enough runs off or evaporates, and the water that has absorbed must wet the soil until it reaches the roots. Examples of such devices include irrigation conduits and pipes, sprinkler hoses, and hoses having a porosity for trickling water under pressure to soak soil in the surrounding area. Soil soaking hoses leak water slowly over their entire surface and length, and are currently made from vinyl plastic, natural rubber, synthetic rubber or a thermoplastic rubber with various water flow restriction attachments or fittings. A number of relevant patents directed toward flow control devices for attachment to such hoses have been granted.

U.S. Pat. No. 2,781,058 issued to Warhus discloses an improved flow control device which will maintain a preselected rate of flow within relatively close limits over a wide range of pressure drops across the device. Further, the patent discloses a casing having inflow and outflow passages for connection to fluid conduits within which the flow rate is to be controlled. Another device is disclosed in U.S. Pat. No. 2,815,041 to Rimsha et al. which teaches a single solenoid hydraulic control valve for controlling the power and return strokes of a fluid actuating mechanism. U.S. Pat. No. 2,891,578 to Dahl et al. is, likewise, directed to a flow control device. In the U.S. Pat. No. '578 patent, the resilient flow control device is readily flexible in a downstream direction upon increasing fluid pressure acting on the upstream face thereof and it returns to its initial position upon pressure reduction. The flow device comprises a retaining ring which may be a press fitted insert. U.S. Pat. No. 3,072,151 to Quercia discloses a gas regulator having a restricting channel formed in an elastically deformable material.

U.S. Pat. No. 3,833,019 to Diggs discloses quick connect fittings for a trickle type irrigation system. The fittings have a pair of body members threadably joined together for clamping a resilient compressible orifice member therebetween. The body members engage the compressible orifice member and compress it radially inwardly to reduce the orifice size. U.S. Pat. No. 4,105,050 to Hendrickson et al. also discloses an elastomeric flow restrictor for constant fluid delivery in a system having broad ranges of input pressures.

In addition to flow restricting hose fittings described above, prior art patents disclose porous soil soaking hoses. For instance, U.S. Pat. No. 2,807,505 issued to Weitzel discloses a soil soaking hose made of porous plastic material for use in watering gardens, lawns or the like. More specifically, the hose has walls made of plastic material having a porous sponge-like structure which contains a multiplicity of interconnected irregular shaped pores. More recent U.S. Pat. Nos. 4,517,316 and 4,616,055 to Mason et al. disclose porous irrigation pipes prepared from particulate elastomer or crumb rubber and thermoplastic binder that have porosities along the length of the pipe.

In view of the above prior art, more efficient and inexpensive systems for the uniform delivery of water are needed. There is a particular need for a soaker hose for effectively irrigating crops, cultivation benches, lawns, foliage, planters, gardens, and the like, with a slow thorough water seepage. A soaker hose that is suitable for common pressures and even distribution of water is also desired.

SUMMARY OF THE INVENTION

This invention is directed to a flexible soaker hose for the even distribution of pressurized water therethrough. The hose has a water inlet end and a closed end with a porous wall for slow seepage of water uniformly therethrough along its length when water is delivered under pressure through the inlet end. Provided near the inlet end is a rigid wall having a fixed aperture restricting the flow of water through the hose from a pressurized source for uniform seepage to the surrounding soil.

In other features of this invention, the hose is especially adapted for use as a garden soaker hose in homes where water pressures range from about 25 to about 120 psi. In a preferred form, the hose is made of foamed polyvinyl chloride (PVC) having a porous wall thickness of about 0.1 inch to about 0.2 inch and inside diameter (ID) between about 0.5 inch and 3 inches. Most preferably, the hose has an inside diameter (ID) of about 0.5 to about 1 inch for household purposes.

As developed more fully hereinafter, this invention is predicated in part upon the discovery of a flexible soaker hose having a rigid wall with a fixed aperture at the inlet end. The exact configuration and location of the rigid wall may vary. For instance, the rigid wall may be integrally formed with the porous wall at or near the inlet end of the hose. In a more preferred form, the rigid wall at the inlet end is a separate circular disk sized to the inlet end providing a sufficient seal so that its fixed aperture restricts the flow of water under pressure through the permeable hose. In effect the disk provides a fixed hole to restrict flow through a flexible permeable hose to allow for effective uniform water seepage.

The disk flow restrictor can be made of any rigid material such as metal or plastic polymers including polyethylene, polypropylene and other polyolefins. Of course the disk aperture can vary in dimensions depending upon the water pressures, permeability of the hose, hose flexibility or strength, volume of water delivered and other factors. For example, a rigid disk of polyethylene or polypropylene for use in a typical porous 0.5 inch (ID) PVC soaker hose may have a thickness of about ⅛ inch, a circumference of about 1.57 inches, and an aperture diameter of about 0.1 inch. The hose porosity is sufficient to deliver about 1 to 2 gallons per minute at water delivery pressures in a range of about 50–60 psi.

In a preferred embodiment of the present invention, the hose is adapted to be coupled at the inlet end. Coupling can be achieved in a number of ways. Standard metal or plastic annular couplings can be used. Plastic couplings can be molded onto the hose, if desired. A coupling having an annular corrugation can be used thereby sealing the hose end against pressurized water leakage. For example, a first annular corrugated ferrule on the outside wall surface of the hose is provided with a second corrugated ferrule on the inside wall surface of the hose for sealing said hose and therebetween to prevent inlet end leakage. The opposite or closed end can be sealed by closed end metal or plastic fittings in a fashion well understood in the art.

In a further feature, the soaker hose inlet end has a washer for securing the rigid disk in the coupling. The washer fits uniformly in the inlet end for additional securement of the disk when the female coupling is secured onto an appropriate water source for the delivery of pressurized water. This feature further aids in preventing leakage between the coupling and the pressurized water source.

The presently preferred form of the invention is a flexible household water soaker hose for the delivery of pressurized water therethrough. The soaker hose comprises a hose of foamed vinyl plastic, such as polyvinyl chloride (PVC), having a water inlet end for coupling and a closed end. Other polymers such as natural rubber, thermoplastic rubber or synthetic rubber may be used for the foamed hose. Additionally, the hose has a porous wall for slow seeping of water uniformly therethrough along the length of the porous wall when water is delivered under pressure through the inlet end. The soaker hose further comprises a rigid disk secured by a coupling washer at the inlet end. In a 0.5 inch (ID) hose, the disk is about 1.0 inch in diameter when used with an end coupling and has a fixed aperture of about 0.1 inch for restricting the flow of water therethrough from a pressurized source of about 25 to 120 psi through the porous wall for uniform seepage. The hose has a porous wall thickness of about 0.1 inch to about 0.2 inch.

The soaker hose of this invention is able to gently soak desired areas due to flow restriction of pressurized water by the fixed aperture of the rigid disk. This substantially equalizes pressure throughout the length of the hose and prevents surging of water therethrough. Essentially, the restrictor disk determines and provides the desired seepage for watering the soil through the flexible permeable wall. It will also be understood, in view of the detailed description herein, that the size of the disk aperture has to be related to the thickness and porosity of the porous wall so that the hose has enough water flow to seep through the porous wall along its length. The purpose of the inventive soaker hose is to deliver a sufficient amount of water over time to soak, not flood, the surrounding soil. This invention satisfies a continuing need in garden and lawn soaker hoses in a simple and effective manner.

In accordance with the novel features and embodiments of this invention which will become further apparent hereinafter, the present invention will be described with reference to the detailed description and the accompanying drawings in which:

DETAILED DESCRIPTION OF THE PREFERRED EMBODIMENT

To illustrate and provide a more complete understanding of the present invention, the following description details the flexible soaker hose and its embodiments.

Figure 1:
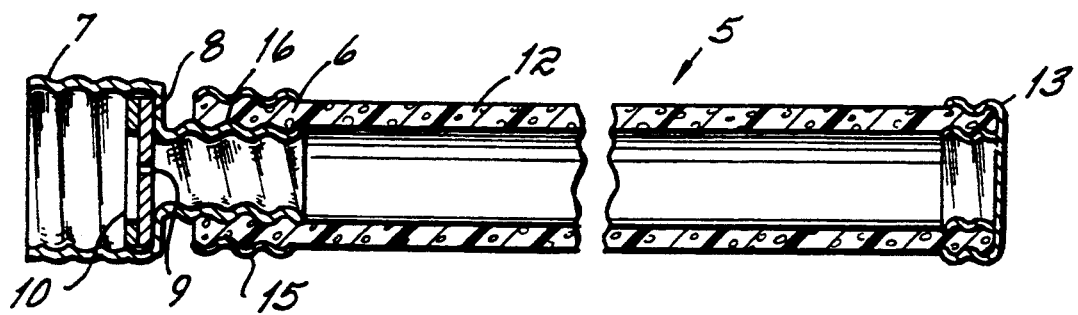
FIG. 1 is a longitudinal cross-sectional view of one form of the present invention with a connector coupling after crimping.

Referring now more particularly to the figures in which like reference to characters indicate like elements throughout, FIG. 1 shows a flexible porous soaker hose generally at 5. Shown generally at 6, the inlet end of the hose 5 has attached a female coupling 7. The opposite end of the hose 5 is closed by a metal end cap 13 that is crimped onto hose 5. Sized to fit inside the female coupling 7 is a rigid disk 8 with a fixed aperture 9. Also sized to fit inside the female coupling 7 is a coupling washer 10. Rigid disk 8 has a fixed aperture 9 for restricting the flow of water through aperture 9 from a pressurized source through porous wall 12 thereby providing uniform seepage through wall 12. The presently preferred seepage is explained more fully hereafter.

Rigid disk 8 is made of a plastic polyolefin material or metal. Examples of plastic include polypropylene and polyethylene. Disk 8 is rigid and aperture 9 is fixed in contrast to those flow restrictors described in the background of this invention. The rigid disk with fixed aperture functions with the flexible porous wall to allow uniform seepage of water along its length.

For purposes of describing the presently preferred embodiment, the rigid disk 8 of polyethylene or polypropylene of about ⅛ inch thickness is used with a diameter of about 0.5 inch for a hose of similar ID, a circumference of about 1.57 inches and an aperture diameter of about 0.1 inch. These dimensions are such that the rigid disk 8 is sized to about 1 inch to fit securely in the female coupling 7 at the inlet end 6 for use at water pressures of about 25 to 120 psi. A coupling washer 10 provides further securement of rigid disk 8 when fitted to female coupling 7. Therefore, at the inlet end 6, a tight seal about disk 8 is obtained when the hose is attached to a pressurized water source and the outlet end is sealed by end cap 13 for water seepage along the hose.

FIG. 1 further illustrates the hose inlet 6 with an external ferrule 15 and an internal corrugated connector 16 as a standard female coupling connector 7 crimped to porous hose wall 12. Crimping is the procedure that is used to securely fasten connecting couplings. Briefly explained, a hardened steel collet (not shown) is inserted into connector coupling 7 with connector 16 that has been placed into porous wall 12. A tapered shaft (not shown) is then driven forward deforming some portion of the connector 16 inside the porous wall 12 in a corrugated pattern and creating a leak-proof seal by wedging wall 12 between the deformed connector 16 and an opposingly corrugated ferrule 15. The crimping is done in a corrugated fashion, i.e., there are areas of greater and lesser compression, thus, allowing a better seal of the porous wall material. A male connector coupling (not shown) is attached the same way as a female connector coupling at end cap 13 which may then be sealed by a screw cap (not shown).

In order to demonstrate the principles of this invention, a 0.5 inch ID soaker hose of PVC was extruded having a wall thickness of about 0.1-0.2 inch and porosity to deliver about 1-2 gpm along a 50 foot length. This soaker hose is made by standard techniques and is made up of a blended composition well known in the art. The blended hose composition comprises (by weight) a polyvinyl chloride (PVC) resin 40-45%, plasticizer 15-20%, lubricant 1.5-2.5%, stabilizer 1-5%, filler such as calcium carbonate 20-25%, and foaming agent such as diazocarbamide or oxybis-sulfonyl hydrazide ½-1%. The components without foaming agent are all blended together and prior to extrusion the foaming agent is added using standard industrial practices to form a porous wall soaker hose. Tests were then conducted with such an extruded porous hose having a polypropylene disk restrictor as above described with a fixed aperture of about 0.1 inch in diameter.

Figure 2:
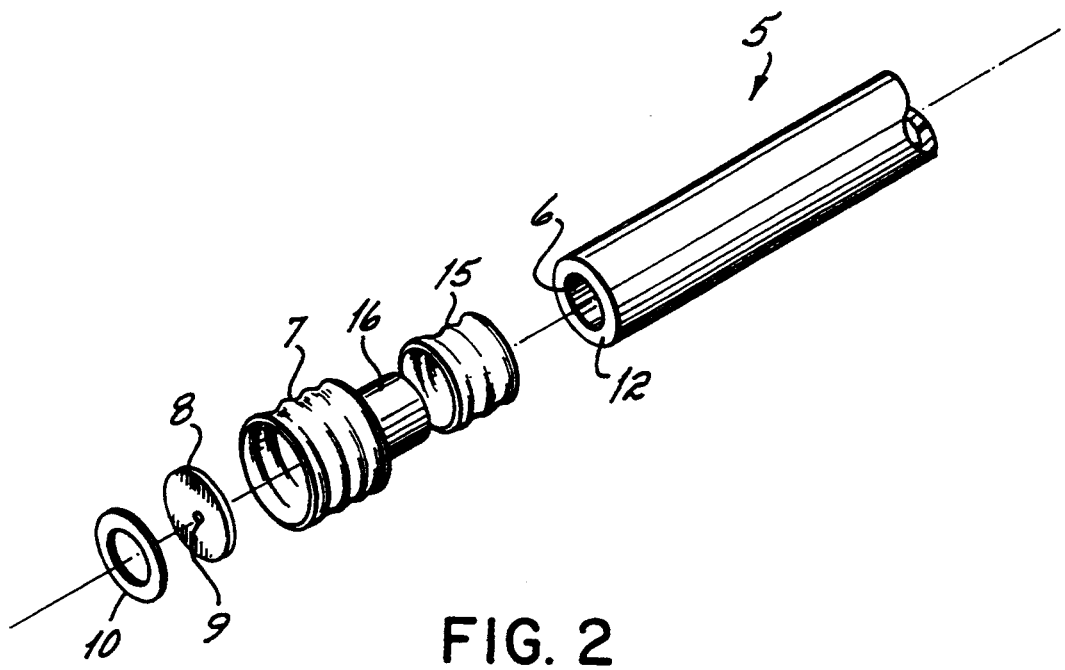
FIG. 2 is an exploded view of FIG. 1 illustrating the coupling connector, coupling washer and rigid restrictor disk.

The following conditions were employed during the conduct of the tests on ½ inch internal diameter hoses assembled in a fashion similar to that described above in FIGS. 1-2:

1) 100 psi water was furnished to a pressure regulator set for discharge at 50 psi to the hose inlet.
2) Five sample hoses of 50 feet in length were tested with the disk restrictor.
3) Water was run through the hoses for approximately three minutes and collected in a tub and weighed.
4) A pressure gauge was placed at the end of the hose and the pressure was recorded.

The following Table describes the results of the tests:

| Sample No. | Test Time min. | Water Weight lbs. | Equivalent Gallons | Flow Rate gpm | Hose End Press psi |
|---|---|---|---|---|---|
| 1 | 3 | 31.75 | 3.8 | 1.35 | 0 |
| 2 | 3 | 30.53 | 3.7 | 1.30 | 0 |
| 3 | 3.4 | 38.75 | 4.6 | 1.44 | 0 |
| 4 | 3 | 39.125 | 4.7 | 1.64 | 0 |
| 5 | 3 | 32.25 | 3.7 | 1.37 | 4 |

Other tests were conducted using a 25 foot ½ inch internal diameter porous hose with the 0.1 inch hole diameter disk restrictor. The water entered the inlet end of the porous hose at about 50-60 psi. The water pressure was recorded at about 5-10 psi at the outlet end. The porosity of the hose enabled a uniform flow rate of 1.5±0.2 gallons per minute along its length with the pressure regulator set for a discharge of 50 psi. A person of ordinary skill in the art will be able to make a porous hose having such porosities or equivalent porosities to practice this invention. Such hoses themselves are known but have not been used with the unique flow restrictor of this invention.

The above tests illustrate that a porous hose of various lengths can provide an adequate seepage of water therethrough to properly soak a desired area without ballooning. The delivery of water seepage without ballooning is due to the fixed hole rigid disk restrictor 8 at the inlet end 6 of the hose. The internal pressure on the porous wall 12 is not so great to result in an inflation of the porous wall. The internal pressure produces the desired uniform seepage through the porous wall at an acceptable rate.

While specific embodiments of the present invention have been shown and described, it should be apparent that many modifications can be made thereto without departing from the spirit and scope of the invention. Accordingly, the invention is not limited by the foregoing description, but is only limited by the scope of the claims appended hereto.

What is claimed is:

1. A flexible soaker hose for the delivery of pressurized water therethrough comprising
    a flexible porous hose having a water inlet end for coupling to a pressurized water source and a closed end, said hose having a flexible porous wall for slow seepage of water uniformly therethrough along the length of said porous wall when water is delivered under pressure through said inlet end, said flexible porous hose having a propensity to balloon under said water pressure by inflation of the porous wall, and
    a rigid wall near the inlet end having a fixed aperture restricting the flow of water therethrough from the pressurized source through said porous wall for said uniform seepage of water along the length of said porous wall, said rigid wall and fixed aperture for preventing ballooning of said hose,
    the size of said aperture being related to the thickness and porosity of the porous wall so that the hose has enough water flow to uniformly seep therethrough along the length of said porous wall without hose ballooning.

2. The hose of claim 1 for use with water at pressures ranging from about 25 to about 120 psi.

3. The hose of claim 1 for use as a garden soaker.

4. The hose of claim 1 made from a foamed polymer selected from the group of vinyl plastic, natural rubber, synthetic rubber or thermoplastic rubber.

5. The hose of claim 1 having an inside diameter of about 0.5 inch to about 3 inches.

6. The hose of claim 1 wherein said rigid wall is a separate circular rigid disk sized to said inlet end having a fixed central hole.

7. The hose of claim 6 made of foamed polyvinyl chloride and said disk made of polyolefin plastic.

8. The hose of claim 6 wherein said inlet end has a coupling for securement to said water source.

9. The hose of claim 8 having a coupling washer for securing the rigid disk in said coupling.

10. A flexible household water soaker hose for the delivery of pressurized water therethrough comprising
    a flexible porous hose having a water inlet end with a coupling for securement to a pressurized water source and a closed end, said hose having a flexible porous wall for slow seepage of water uniformly therethrough along the length of said porous wall when water is delivered under pressures from about 25 to about 120 psi through said inlet end, said flexible porous hose having a propensity to balloon under said water pressure by inflation of the porous wall, and
    a rigid disk secured in said coupling at the inlet end, said disk having a fixed aperture for restricting the flow of water therethrough from the pressurized source through said porous wall for said uniform seepage of water along the length of said porous wall, said rigid disk and fixed aperture for preventing ballooning of said hose,
    the size of said disk aperture being related to the thickness and porosity of the porous wall so that the hose has enough water flow to uniformly seep therethrough the length of said porous wall without hose ballooning.

11. The hose of claim 10 made of foamed polyvinyl chloride (PVC).

12. The hose of claim 10 having an inside diameter between about 0.5 inch and about 1 inch.

* * * * *

UNITED STATES PATENT AND TRADEMARK OFFICE
CERTIFICATE OF CORRECTION

PATENT NO. : 5,368,235
DATED : November 29, 1994
INVENTOR(S) : Matthew L. Drozdoff and Steven R. Hopps It is certified that error appears in the above-indentified patent and that said Letters Patent is hereby corrected as shown below:

Col. 7 Line 4 "therethrough the length" should be --therethrough along the length--

Signed and Sealed this

Eleventh Day of April, 1995

Attest:

BRUCE LEHMAN

Attesting Officer

Commissioner of Patents and Trademarks